United States Patent
Fukuda et al.

(10) Patent No.: US 7,085,268 B2
(45) Date of Patent: Aug. 1, 2006

(54) COMMUNICATION SYSTEM, COMMUNICATION METHOD, TRANSMITTING TERMINAL AND RECEIVING TERMINAL

(75) Inventors: Kazuma Fukuda, Tokyo (JP); Norihito Takatori, Tokyo (JP); Seiji Okumura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 874 days.

(21) Appl. No.: 09/958,747

(22) PCT Filed: Feb. 13, 2001

(86) PCT No.: PCT/JP01/00964

§ 371 (c)(1),
(2), (4) Date: Oct. 12, 2001

(87) PCT Pub. No.: WO01/61942

PCT Pub. Date: Aug. 23, 2001

(65) Prior Publication Data

US 2002/0136164 A1 Sep. 26, 2002

(30) Foreign Application Priority Data

Feb. 15, 2000 (JP) ............................. 2000-036230

(51) Int. Cl.
*H04L 12/56* (2006.01)
(52) U.S. Cl. .................... 370/389; 370/473
(58) Field of Classification Search ................ 370/229, 370/230, 232, 389, 394, 395.21, 516
See application file for complete search history.

(56) References Cited

U.S. PATENT DOCUMENTS

| 5,042,027 | A | * | 8/1991 | Takase et al. ............... 370/252 |
| 5,790,538 | A | | 8/1998 | Sugar |
| 5,883,819 | A | | 3/1999 | Abu-Amara et al. |
| 6,327,274 | B1 | * | 12/2001 | Ravikanth ................... 370/516 |
| 6,360,271 | B1 | * | 3/2002 | Schuster et al. ............ 709/231 |
| 6,434,606 | B1 | * | 8/2002 | Borella et al. .............. 709/214 |
| 6,658,027 | B1 | * | 12/2003 | Kramer et al. ............... 370/516 |
| 6,765,904 | B1 | * | 7/2004 | Anandakumar et al. .... 370/389 |

FOREIGN PATENT DOCUMENTS

| JP | 2616657 | 2/1994 |
| JP | 06209330 A | 7/1994 |
| JP | 06268634 A | 9/1994 |
| JP | 07303117 A | 11/1995 |
| JP | 11284659 A | 10/1999 |
| JP | 2000-332829 | 11/2000 |

* cited by examiner

*Primary Examiner*—Man U. Phan
*Assistant Examiner*—Toan Nguyen
(74) *Attorney, Agent, or Firm*—Birch, Stewart, Kolasch and Birch, LLP

(57) ABSTRACT

In a communication system using a terminal connected to a packet network, the invention predicts a future communication state between terminals. This invention may also control congestion by delivering the packet according to the predicted future communication state. A receiving state monitor calculates a moving average of jitter and a packet loss rate based on a packet received by a packet receiver. A controller of a sending bit rate and an encoding rate obtains the moving average of jitter and the packet loss rate predicts a future communication state, and controls the sending bit rate and/or the encoding rate.

25 Claims, 4 Drawing Sheets

COMMUNICATION SYSTEM, COMMUNICATION METHOD, TRANSMITTING TERMINAL AND RECEIVING TERMINAL

TECHNICAL FIELD

This invention relates to a communication system using terminals connected to a packet network. Particularly, this invention relates to a communication system for predicting and detecting a congestion state between the terminals and controlling congestion to deliver packets according to the state.

BACKGROUND ART

In communications of image data and voice data in the packet network, where a small delay is allowable, when the congestion occurs in a communication network between the terminals, a delay in transmission of the packet increases and a packet loss occurs. Therefore, a smooth regeneration becomes difficult or impossible.

For solving the delay in transmission and the packet loss, there is a method for notifying a sending terminal of the delay in transmission, packet loss rate, etc. obtained by measuring a receiving state at a receiving terminal and changing a sending bit rate and an encoding rate to avoid the congestion.

As disclosed in U.S. Pat. No. 2,616,657, there is also a method for coping with the congestion at an early stage by setting a relay node between the terminals. Further, concerning on an increase of the delay in transmission, there is a method for accepting a certain delay by setting a buffer in a side of the receiving terminal.

Concerning on detection of the congestion state in the network, as disclosed in Published Patent Application Hei 07-303117, there is a method for judging by comparing the packet loss rate or a throughput or a roundtrip time with one or two or more threshold values.

In controlling the congestion when the congestion is detected, there is a method for avoiding or easing the congestion by controlling the sending bit rate and the encoding rate step by step.

There is also a method for reserving a communication bandwidth in the network from the terminal before communication and maintaining a necessary communication bandwidth for preventing the occurrence of the congestion. However, according to this method, when it is impossible to maintain the communication bandwidth, a connection is rejected.

When a packet is lost, for utilizing data in the packet, there is a method of requesting retransmission of the lost packet or generating the lost packet from a redundant packet and the packet received at the receiving terminal by sending the redundant packet.

In coping after detecting the congestion, even if the congestion is detected early, the sending bit rate and the encoding rate are changed later. Therefore, the congestion state continues for a while until being coped with.

For detecting the congestion, there are methods for detecting by the terminal and in the relay node. For detecting in the relay node and the receiving terminal, it is necessary to inform at least the sending terminal after detecting the congestion. Therefore, an additional packet is sent during the congestion, and there is a possibility that the congestion becomes worse.

This invention was intended to solve the above-stated problems. This invention aims at predicting the congestion from an earlier state of the network for preventing the congestion.

For judging the state of the network and detection of the congestion by a parameter, e.g., packet loss rate or throughput, roundtrip time, etc., there is a possibility that the judgement is affected by data due to a temporary noise.

For solving the above-stated problems, this invention aims at reducing the influence from the temporary noise by judging in combining a plurality of parameters and achieving more accurate judgement. This invention also aims at realizing an effect by using a method for deriving a value used in judgement with less influence from the noise.

When the sending bit rate and the encoding rate are controlled step by step after judging the state of the network and detecting the congestion, an amount of a change due to a difference, rate, etc. used in judging and detecting tends not to reflect on the control. Therefore, there is a problem that a sufficient effect is not realized in a result of the control on the state of the network and the congestion. Further, when the state is recovered from the congestion state, there is a problem that a sufficient effect is not realized also in a quick recovery from the dropped sending bit rate and encoding rate.

This invention is intended to solve this problem and improve the accuracy in the control.

For assigning a communication bandwidth, communication protocol for assigning queuing in communication between the terminal and the relay node in the network must be packaged. It is necessary that the communication protocol is packaged in the terminal and the relay node between the terminals. There is a problem that even if the communication protocol is packaged only between the terminals, it is not sufficient. This is disclosed in U.S. Pat. No. 2,616,657 for example.

This invention intends to solve this problem and simplify a configuration of the communication system.

For correcting an error of the lost packet, there is a problem that if the error is corrected by resending, it is too late for regeneration time, and the congestion becomes worse as the resending request increases at the time of the congestion. There is also a problem that when a redundant packet is sent, a communication bandwidth which can be used for sending an original packet becomes narrower.

This invention intends to solve this problem and correct the error without worsening the congestion while sending the original packet efficiently.

As stated, it is a primary aim of this invention to predict the congestion by sending a report on the receiving state at the receiving terminal to the sending terminal, preventing the congestion in advance based on the prediction, and securing real-time quality of the communication.

DISCLOSURE OF THE INVENTION

A communication system according to this invention includes a sending terminal and a receiving terminal, and the sending terminal includes a packet sender for sending packets. The receiving terminal includes a packet receiver for receiving the packets, a receiving state monitor for calculating a moving average of jitter and a packet loss rate based on the received packets, and a receiving state sender for sending the calculated moving average of jitter and the calculated packet loss rate. The sending terminal further includes a receiving state receiver for receiving the moving average of jitter and the packet loss rate, and a controller for judging a communication state based on the received moving average of jitter and the received packet loss rate.

The receiving state monitor calculates the moving average of jitter and the packet loss rate in each determined time sequentially, and the receiving state sender sends the sequentially calculated moving average of jitter and the sequentially calculated packet loss rate sequentially. The receiving state receiver receives the moving average of jitter and the packet loss rate sequentially, and the controller judges the communication state sequentially based on the sequentially received moving average of jitter and the sequentially received packet loss rate.

The controller judges the communication state based on a threshold value of the moving average of jitter and a threshold value of the packet loss rate.

The controller detects a congestion.

The controller predicts a congestion.

The controller further predicts a change in the communication state based on sequentially judged changes in the communication state.

The controller controls a sending bit rate for sending the packets from the packet sender based on the judged communication state.

The controller controls a sending bit rate for sending the packets from the packet sender based on the predicted change in the communication state.

The sending terminal includes an encoder for encoding sending data. The controller controls an encoding rate for encoding the sending data by the encoder based on the judged communication state.

The sending terminal includes an encoder for encoding sending data. The controller controls an encoding rate for encoding the sending data by the encoder based on the predicted change in the communication state.

The controller controls a sending bit rate for sending the packets from the packet sender and changes the threshold value of the moving average of jitter based on the controlled sending bit rate.

The controller determines a control amount of a sending bit rate based on at least one of a difference between the received moving average of jitter and a threshold value of the moving average of jitter and a difference between the received packet loss rate and a threshold value of the packet loss rate and controls the sending bit rate for sending the packets from the packet sender based on the determined control amount of the sending bit rate.

The sending terminal includes an encoder for encoding sending data. The controller determines a control amount of an encoding rate based on at least one of a difference between the received moving average of jitter and a threshold value of the moving average of jitter and a difference between the received packet loss rate and a threshold value of the packet loss rate and controls the encoding rate for encoding the sending data by the encoder based on the determined control amount of the encoding rate.

The controller predicts a sending bit rate which is higher than a present rate and sufficient for maintaining a stable state when the judged communication state is the stable state and controls the sending bit rate for sending the packets from the packet sender based on the predicted sending bit rate.

The sending terminal includes an encoder for encoding sending data. The controller predicts an encoding rate which is higher than a present rate and sufficient for maintaining a stable state when the judged communication state is the stable state and controls the encoding rate for encoding the sending data by the encoder based on the predicted encoding rate.

The controller determines a number of redundant packets based on at least one of a difference between the received moving average of jitter and a threshold value of the moving average of jitter and a difference between the received packet loss rate and a threshold value of the packet loss rate. The packet sender sends the redundant packets according to the determined number of the redundant packets.

The controller determines a number of packets which can correct an error based on at least one of a difference between the received moving average of jitter and a threshold value of the moving average of jitter and a difference between the received packet loss rate and a threshold value of the packet loss rate. The packet sender sends the redundant packets according to the determined number of the packets which can correct the error.

A communication method according to this invention is a communication method in a communication system including a sending terminal and a receiving terminal. The communication method includes steps of:

sending packets from the sending terminal;

receiving the packets by the receiving terminal;

calculating a moving average of jitter and a packet loss rate based on the received packets;

sending the calculated moving average of jitter and the calculated packet loss rate from the receiving terminal;

receiving the moving average of jitter and the packet loss rate by the sending terminal; and judging a communication state based on the received moving average of jitter and the received packet loss rate by the sending terminal.

A sending terminal according to this invention includes following elements:

(1) a packet sender for sending packets to a receiving terminal;

(2) a receiving state receiver for receiving a moving average of jitter and a packet loss rate which are calculated based on the received packets by the receiving terminal from the receiving terminal; and (3) a controller for judging a communication state based on the received moving average of jitter and the received packet loss rate A receiving terminal according to this invention includes following elements:

(1) a packet receiver for receiving packets;

(2) a receiving state monitor for calculating a moving average of jitter and a packet loss rate based on the received packets; and (3) a receiving state sender for sending the calculated moving average of jitter and the calculated packet loss rate

BEST MODE FOR CARRYING OUT THE INVENTION

EMBODIMENT 1

Figure 1:
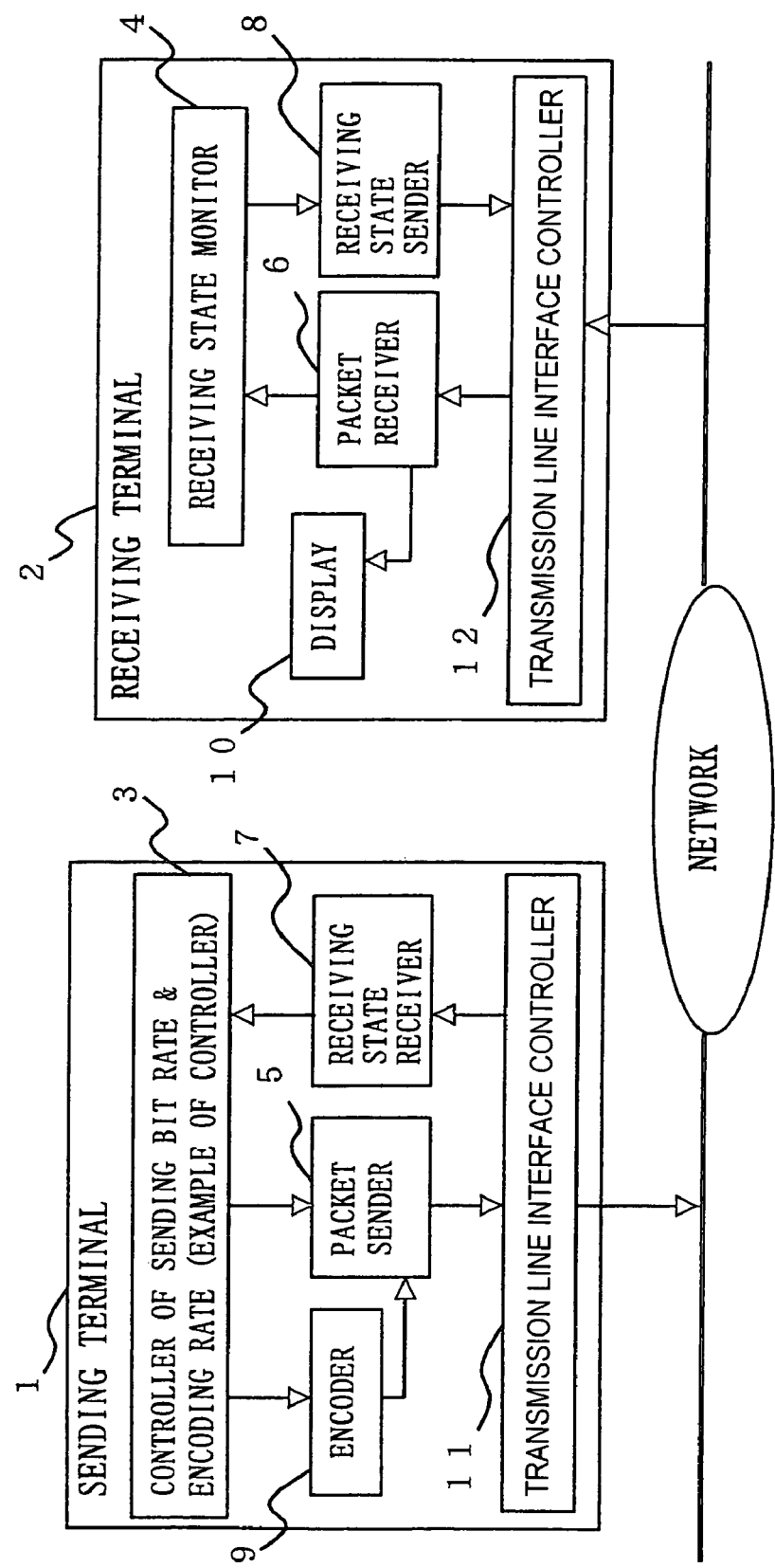
FIG. 1 shows a block chart illustrating a configuration of a communication system in Embodiment 1.

In the following, this invention is explained based on an embodiment illustrated in drawings. FIG. 1 shows the block chart illustrating the configuration of the communication system in Embodiment 1.

In FIG. 1, a sending terminal 1, a receiving terminal 2, a controller 3 of a sending bit rate and an encoding rate for determining the encoding rate of encoding data and a sending time interval of sending packets by predicting a congestion state based on a report on a receiving state from the receiving terminal, a receiving state monitor 4 for calculating the moving average of jitter and the packet loss rate at the receiving terminal, a packet sender 5, a packet receiver 6, a receiving state receiver 7, a receiving state sender 8, an encoder 9, a display 10, and a transmission line interface controller 11 are illustrated.

Operations are explained.

Based on the determination by the controller 3 of the sending bit rate and the encoding rate at the sending terminal 1, data encoded by the encoder 9 are sent from the packet sender 5 to the packet receiver 6 in the receiving terminal 2 as a packet.

The receiving state monitor 4 in the receiving terminal 2 calculates the moving average J of jitter and the packet loss rate P in determined time (also called unit time) for reporting regularly.

At first, a calculation method of the moving average J of jitter is explained.

According to an order of receiving at the packet receiver 6, a sending time interval and a receiving time interval from a packet which was received immediately before are obtained. Further, a difference between the obtained sending time interval and the receiving time interval is calculated. This difference is indicated as a time interval difference D. The time interval difference D (i, j) between a packet received in the i-th and a packet received in the j-th can be calculated by the following formula:

$$D(i, j) = (Rj - Ri) - (Sj - Si)$$

Rj and Ri are receiving time of the packets j and i respectively. Sj and Si are sending time of the packets j and i respectively. The sending time is obtained as data included in the packet.

Then, the moving average J of jitter (j) of packets which have been received so far is calculated. The moving average J (j) of jitter can be calculated by the following formula:

$$J(j) = J(j-1) + (|D(j-1,j)| - J(j-1))/a$$

A constant number for preventing a temporary noise is indicated as a. This formula uses a formula defined in RTP (Real-time Transport Protocol, RFC1889). Since the moving average is an average obtained dynamically, the moving average is also called as a dynamic average.

With reference to a graph, characteristics of a value obtained by the above formula are explained.

Figure 2:
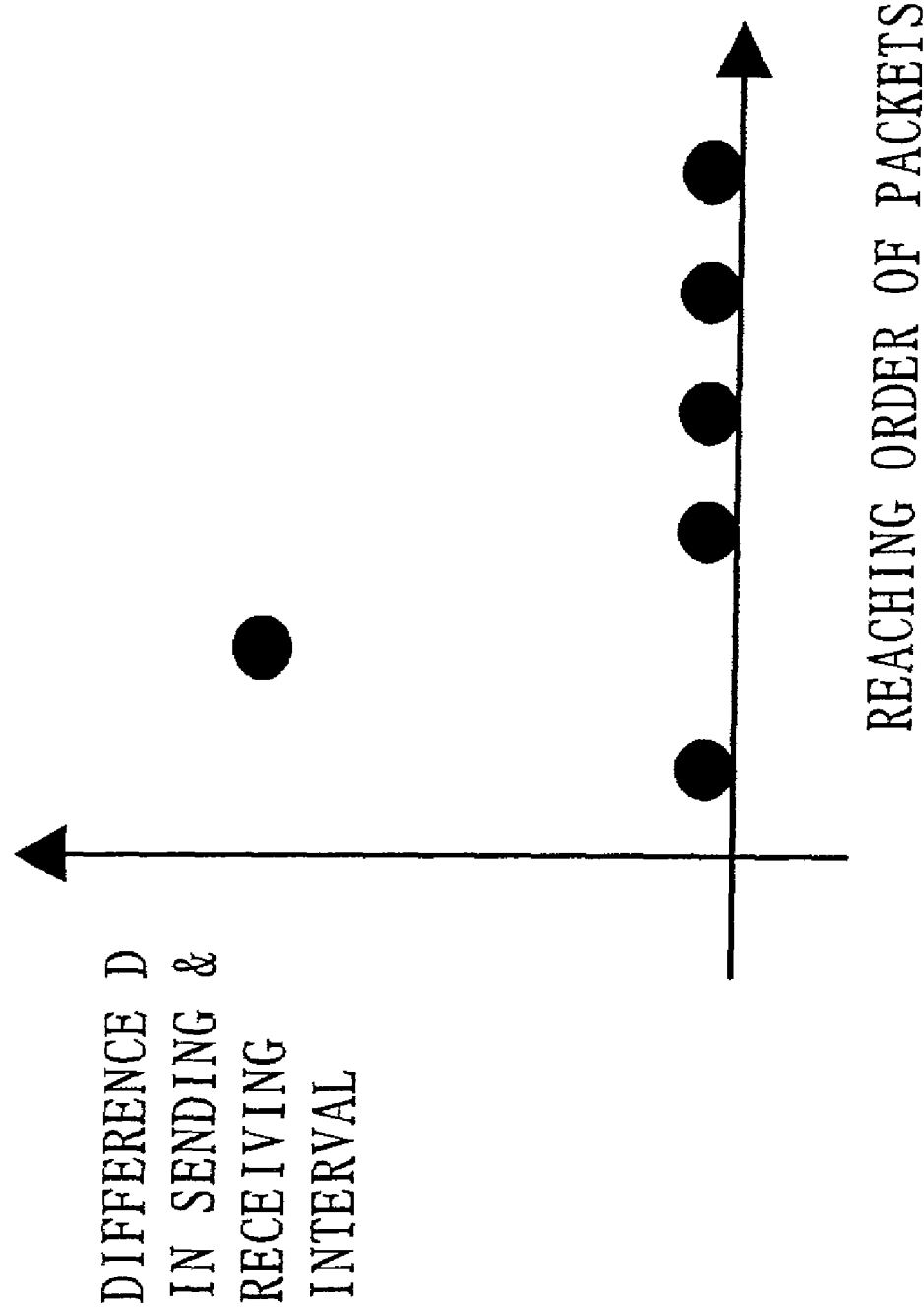
FIG. 2 shows a graph illustrating a change in time interval difference D.

FIG. 2 shows a graph for illustrating a change in the time interval difference D. From the change in the time interval difference D, the characteristics of a transmission state only in short time can be judged. Therefore, the characteristics sometimes show a movement like a noise.

Figure 3:
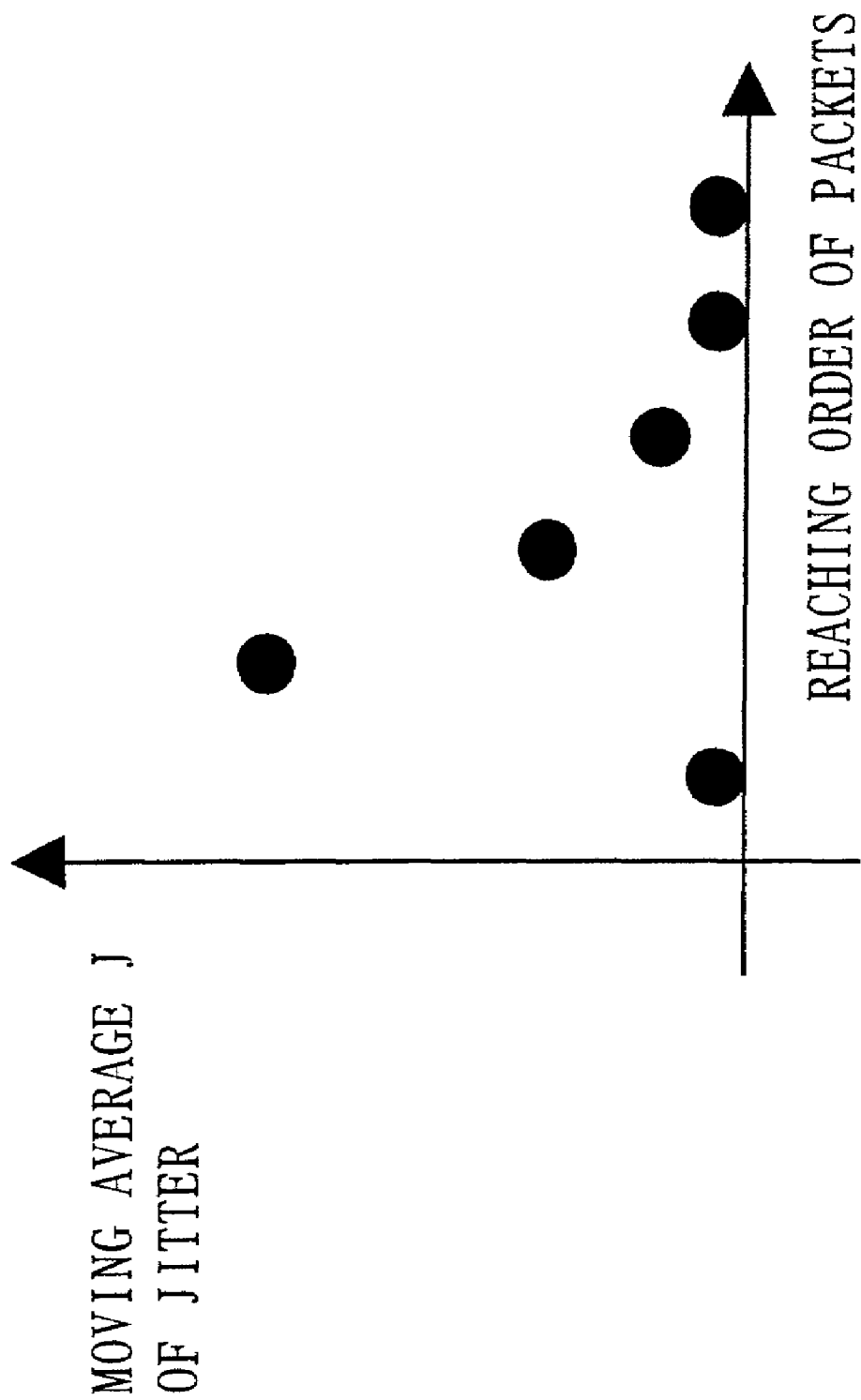
FIG. 3 shows a graph illustrating a change in moving average J of jitter.

FIG. 3 shows a graph for illustrating a change in the moving average J of jitter. The moving average J of jitter is sensitive to a big change in the transmission state. However, when a stable state continues later, the moving average J of jitter converges gradually. A speed of convergence relies on a value of a. When a is small, e.g., 1, it is equal to evaluating by using the time interval difference D. Meanwhile, when a is larger than necessary, the change in the moving average J of jitter becomes less. Therefore, for making the evaluation effective, an appropriate value for reflecting a tendency in the change is adopted as a.

Next, a calculation method of the packet loss rate P is explained.

At first, a difference between a sum of sizes of sent packets and a sum of sizes of received packets when the packets are sent from the sending terminal 1 to the receiving terminal 2 is obtained. That is a sum of sizes of packets which are not received by the receiving terminal.

Further, a ratio of the sum of the sizes of the packets which are not received against the sum of the size of the sent packets is obtained. This ratio is the packet loss rate P.

The receiving terminal 2 sends the moving average J of jitter and the packet loss rate P calculated by the receiving state monitor 4 from the receiving state sender 8 to the receiving state receiver 7 in the sending terminal 1.

In this way, the moving average J of jitter and the packet loss rate P calculated sequentially for each unit time is sent to the sending terminal 1 sequentially.

In the sending terminal 1, a threshold value $\alpha$ of the moving average of jitter and a threshold value $\beta$ of the packet loss rate are set in advance. The threshold value $\beta$ of the packet loss rate is supposed to rely on a content of the sending data, and the threshold value $\beta$ of the packet loss rate is constant unless a data type changes. Meanwhile, the threshold value $\alpha$ of the moving average of jitter can be calculated by the following formula:

$$\alpha = \text{Sending Interval}/a$$

Sending Interval = Packet Size/Sending Bit Rate

A same value used for calculating the moving average of jitter is used as a. In this case, $\alpha$ is equal to a value of the moving average J of jitter when a packet is lost.

When the controller 3 of the sending bit rate and the encoding rate changes the sending bit rate, the threshold value $\alpha$ of the moving average of jitter is supposed to be updated at the same time.

When it is impossible to change the sending bit rate, it is also effective to replace the sending bit rate with the encoding rate.

The state between the terminals is judged by comparing the moving average J of jitter and the packet loss rate P which are reported from the receiving terminal 2 respectively with the threshold value $\alpha$ of the moving average of jitter and the threshold value $\beta$ of the packet loss rate.

Figure 4:
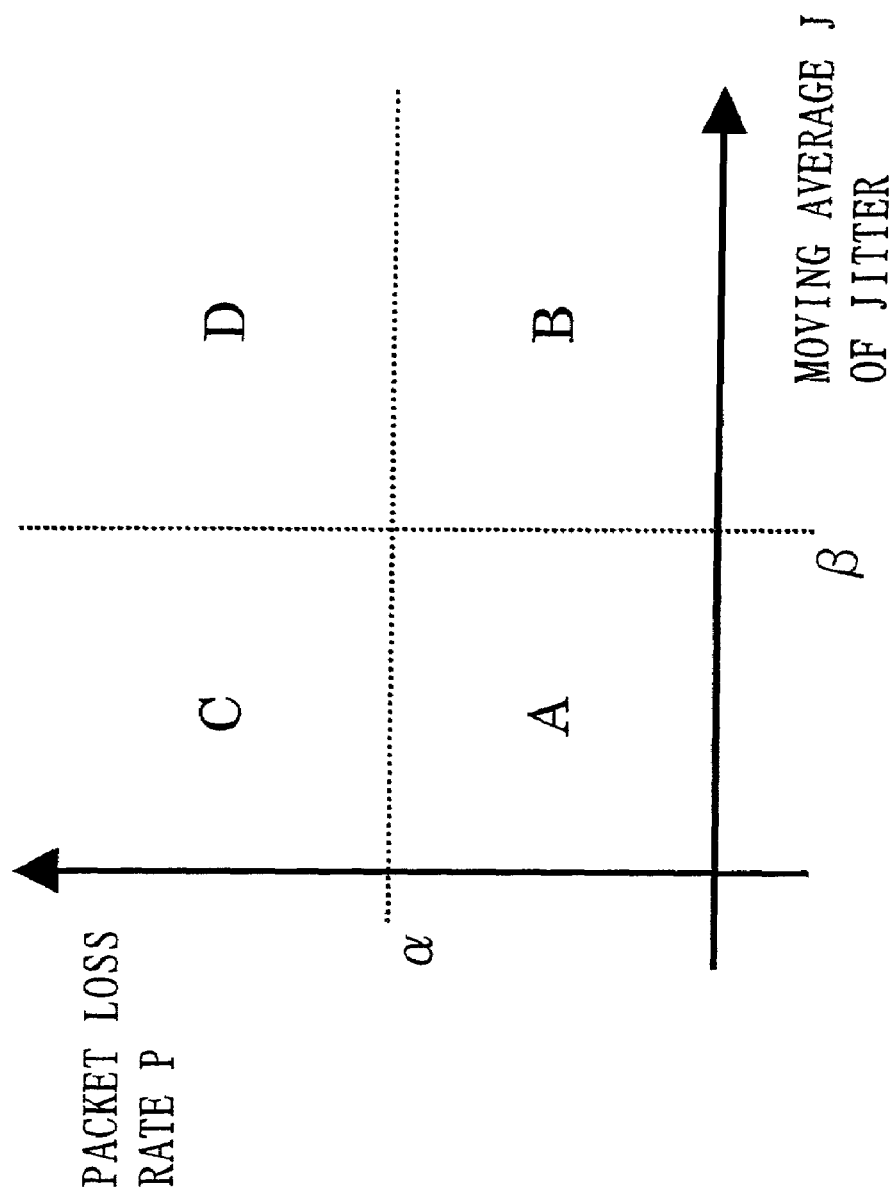
FIG. 4 shows a figure for illustrating a judged state of a terminal.

FIG. 4 shows the judged state of the terminal.

It is judged in which area divided by the threshold values $\alpha$ and $\beta$ the reported values of the moving average J of jitter and the packet loss rate P are included.

In FIG. 4, area A shows a state almost without congestion. Area B shows a state with a sign of the congestion. C shows an easing state of the congestion or a state of temporary congestion. D shows the occurrence of the congestion.

In area A, since both of the moving average J of jitter and the packet loss rate P are below the threshold values, it is judged that the congestion is not occurring.

In area D, since both of the moving average J of jitter and the packet loss rate P are exceeding the threshold values, it is judged that the congestion is occurring.

In area B, the packet loss rate P is still not large and below the threshold value, however the moving average J of jitter is large and exceeding the threshold value. Therefore, it is judged that a delay is occurring. Further, it is predicted that the state can develop into to the congestion.

In area C, the packet loss rate is large and exceeding the threshold value, however the jitter is not large and below the threshold value. According to characteristics of the formula of the moving average of jitter, it is judged that many packet losses occur at a beginning of a unit time, and later the state recovers from the congestion and becomes stable. From this state, a recovery from the congestion can be predicted.

The controller 3 of the sending bit rate and the encoding rate in the sending terminal 1 stores the state in each unit time (time determined for reporting regularly) in time series, and knows changes in the state in each unit time. Further, the congestion is detected and predicted based on the changes in the state.

For example, when the state in area D appears, it is judged that the congestion is occurring. Then, a solution for coping with the congestion is taken immediately.

When the states in area B and area C continue, it is necessary to caution against the congestion. In this case, the congestion is avoided by recognizing the necessity of preventing the congestion and changing the sending bit rate and the encoding rate in advance.

When the state in area A continues, it is judged that the state is stable. It is possible either to maintain the present state or raise the sending bit rate and the encoding rate. When the state comes back to the state in area A, it is possible to change each rate which was changed for coping with the congestion or preventing the congestion back to an original rate.

When the network is in a stable state without the congestion, an efficient rate corresponding to the state of the network can be estimated by raising the sending bit rate and the encoding rate and predicting the occurrence of the congestion in the state.

For example, when the packet loss rate P is exceeding the threshold value $\beta$, there is a method for controlling to reduce the sending bit rate to $\beta/P$ times so that the packet loss rate P becomes less than the threshold value $\beta$. Concerning on the relationship between the moving average J of jitter and the threshold value $\alpha$, there is also a method for controlling similarly.

Further, by setting the efficient rate in this way, an amount of transferring image data and voice data increases, and a quality of regeneration is improved.

Further, for changing the sending bit rate and the encoding rate, according to the difference between the moving average J of jitter and the threshold value $\alpha$ and the difference between the packet loss rate P and the threshold value $\beta$, an amount of a change is adjusted. An appropriate control becomes possible as the amount of the change is variable instead of constant and an amount of the change is increased when the difference is large.

Particularly, for example, the amount of the change is obtained by calculating a ratio of the difference between the received moving average J of jitter and the threshold value $\alpha$ and multiplying a present rate by the calculated ratio.

For example, when the state is changing towards the congestion, the sending bit rate is lowered. When the state is recovered from the congestion, it is controlled to raise the sending bit rate.

As stated, according to this embodiment, at the terminal connected to the packet network, the moving average in the unit time is obtained from the jitter due to the difference between the packet sending time interval at the sending terminal and the packet receiving time interval at the receiving terminal in a receiving order of the packet at the receiving terminal, and the moving average is reported to the sending terminal together with the packet loss rate at the receiving terminal in the same unit time. Accordingly, the sending terminal judges the state of the network between the terminals, and predicts and detects the congestion by analyzing changes of the state in the network which are reported regularly. Therefore, even if there is no relay node, it is possible to predict and detect the congestion between the terminals.

Further, the threshold value of each of the moving average of jitter and the packet loss rate is set, the state of the network and the congestion state are judged by combining comparison results of the threshold values and the respective reported values, and the congestion is predicted and detected based on the change in the state.

Further, in addition to time when the congestion is predicted or occurred, a same solution can be taken at a time of recovering from the state of the congestion. Therefore, the amount of the change is determined by using the difference between the reported value and the threshold value considered at a time of judging the change from the congestion state and the state of the network.

Further, based on the result of predicting and detecting the congestion, a solution is taken for the congestion of the network by changing one or both of the sending bit rate and the encoding rate. Therefore, the amount of the change is determined by using the difference between the reported value and the threshold value considered for judging the change in the congestion state and the congestion state.

Further, the threshold value of the jitter is modified according to the change in the sending bit rate and the encoding rate, the packet loss rate is changed according to a content of the data included in the sending packet. Accordingly, prediction and detection is performed according to the state of the network between the terminals.

Further, by predicting the state of the network, available communication bandwidth can be assumed. By raising the sending bit rate and the encoding rate, the image data and the voice data are increased, and smoother regeneration or high-quality regeneration is realized.

EMBODIMENT 2

In Embodiment 1, an embodiment of predicting and detecting the congestion for controlling the congestion by the controller 3 of the sending bit rate and the encoding rate was explained. In Embodiment 2, an embodiment of sending a redundant packet from the sending terminal for correcting an error for a lost packet in a side of the receiving terminal is explained.

When the redundant packet is sent, a number of redundant packets and a number of packets which can correct an error are adjusted step by step according to the congestion state. For example, when the state is close to the congestion, the congestion becomes worse by sending many packets. Therefore, it is better that a number of the sending packets is smaller. Hence, the congestion state can be eased by increasing a number of packets which can correct the error for a redundant packet or a number of redundant packets and lowering a whole sending rate.

The number of the redundant packets or the number of packets which can correct the error are adjusted by adjusting the amount of the change according to the changes in the congestion state, or one or both of the difference between the moving average J of jitter and the threshold value $\alpha$ and a difference between the packet loss rate P and the threshold value $\beta$ as in the case of changing the sending bit rate and the encoding rate. The amount of the change are gradual. However, it is not necessary to apply in an order of gradual levels. It is also possible to apply a plurality of levels together.

For adjusting the amount of the change, for example, in the congestion state, the number of the redundant packets is decreased for maintaining a transfer rate of data which are intended to be sent originally, or a bandwidth for the redundant packets and the packets for correcting the error is narrowed by increasing the number of the packets which can correct the error. As a method for determining a degree of a change, there are methods such as determining based on a ratio of β and P or a ratio of α and J as stated earlier.

This invention is not limited to the embodiments explained by using FIG. 1, FIG. 2 and FIG. 3. Various modifications are possible as far as such modifications are within the scope of the invention. For example, a number of the threshold value of each of the moving average J of jitter and the packet loss rate P is one in this example. However, it is possible to increase a kind of the state and judge precisely by increasing the number to two or more. Further, this invention can be applied to a case in which encoded image data and voice data are sent without using the encoder 9.

As stated, in this embodiment, when the error is corrected at the receiving terminal by sending the redundant packet, the number of redundant packets and the number of packets which can correct the error are changed to prevent the packet from worsening the congestion at the time of congestion.

INDUSTRIAL APPLICABILITY

In this invention, the communication state is judged based on the moving average of jitter and the packet loss rate. Therefore, it is possible to exclude the noise and judge the state of the network accurately.

Since the communication state is judged sequentially, the change in the state of the network in a data transferring step can be known.

Further, since the communication state is judged based on the threshold value of the moving average of jitter and the threshold value of the packet loss rate, the changes in the state can be known easily.

Further, since the congestion is detected, it is possible to cope with the occurred congestion quickly.

Further, since the congestion is predicted, the congestion can be prevented in advance.

Further, since the change in the communication state is predicted, it is possible to control accurately.

Further, since the sending bit rate is controlled based on the judged communication state, the communication state can be controlled properly.

Further, since the sending bit rate is controlled based on the predicted change in the communication state, the communication state can be controlled properly.

Further, since the encoding rate is controlled based on the judged communication state, the communication state can be controlled properly.

Further, since the encoding rate for encoding is controlled based on the predicted change in the communication state, the communication state can be controlled properly.

Further, since the threshold value of the moving average of jitter is changed based on the controlled sending bit rate, it is possible to control step by step.

Further, since a control amount is determined based on the difference from the threshold value, and the determined amount is used for controlling, a quick control becomes possible.

Further, since the rate is predicted to maintain a stable state, and the predicted rate is used for controlling, the communication efficiency improves and the quality of the regenerated image and voice is improved.

Further, the transmission of the redundant packet is controlled based on the difference from the threshold value, it is possible to prevent the congestion from becoming worse.

The invention claimed is:

1. A communication system comprising a sending terminal and a receiving terminal operably connected to the sending terminal,
    wherein the sending terminal includes a packet sender for sending packets,
    wherein the receiving terminal includes a packet receiver for receiving the packets, a receiving state monitor for calculating a moving average of jitter and a packet loss rate based on the received packets, and a receiving state sender for sending the calculated moving average of jitter and the calculated packet loss rate,
    wherein the sending terminal further includes a receiving state receiver for receiving the calculated moving average of jitter and the calculated packet loss rate, and a controller for predicting at least one future communication state based on the calculated moving average of jitter and the calculated packet loss rates,
    wherein the at least one future communication state includes a future congested state or a recovery from a current congested state,
    wherein the controller predicts that the communication state will develop into the future congested state when the packet loss rate is below the threshold value of the packet loss rate and the calculated moving average of jitter exceeds the threshold value of moving average of jitter; and
    wherein the controller predicts that the communication state will recover from the current congested state when the packet loss rate exceeds the threshold value of the packet loss rate and the calculated moving average of jitter is below the threshold value of moving average of jitter.

2. The communication system of claim 1,
    wherein the receiving state monitor calculates the moving average of jitter and the packet loss rate in each determined time sequentially,
    wherein the receiving state sender sends the calculated moving average of jitter and the calculated packet loss rate sequentially,
    wherein the receiving state receiver receives the calculated moving average of jitter and the calculated packet loss rate sequentially,
    wherein the controller judges a current communication state sequentially based on the calculated moving average of jitter and the calculated packet loss rate and predicts the future communication state based on sequentially judged communication states.

3. The communication system of claim 1, wherein the controller predicts the future communication state based on a threshold value of the moving average of jitter and a threshold value of the packet loss rate.

4. The communication system of claim 3, wherein the controller controls a sending bit rate for sending the packets from the packet sender and changes the threshold value of the moving average of jitter based on the controlled sending bit rate.

5. The communication system of claim 1, wherein the controller predicts a congestion as the future communication state.

6. The communication system of claim 1, wherein the controller further predicts a change in the future communication state based on sequentially judged changes in a current communication state.

7. The communication system of claim 6, wherein the controller controls a sending bit rate for sending the packets from the packet sender based on the predicted change in the future communication state.

8. The communication system of claim 6, wherein the sending terminal includes an encoder for encoding sending data, wherein the controller controls an encoding rate for encoding the sending data by the encoder based on the predicted future change in the communication state.

9. The communication system of claim 1, wherein the controller controls a sending bit rate for sending the packets from the packet sender based on the predicted future communication state.

10. The communication system of claim 1, wherein the sending terminal includes an encoder for encoding sending data, wherein the controller controls an encoding rate for encoding the sending data by the encoder based on the predicted future communication state.

11. The communication system of claim 1, wherein the controller determines a control amount of a sending bit rate based on at least one of a difference between the calculated moving average of jitter and a threshold value of the moving average of jitter and a difference between the calculated packet loss rate and a threshold value of the packet loss rate and controls the sending bit rate for sending the packets from the packet sender based on the determined control amount of the sending bit rate.

12. The communication system of claim 1, wherein the sending terminal includes an encoder for encoding sending data, wherein the controller determines a control amount of an encoding rate based on at least one of a difference between the calculated moving average of jitter and a threshold value of the moving average of jitter and a difference between the calculated packet loss rate and a threshold value of the packet loss rate and controls the encoding rate for encoding the sending data by the encoder based on the determined control amount of the encoding rate.

13. The communication system of claim 1, wherein the controller predicts a sending bit rate which is higher than a present rate and sufficient for maintaining a stable state when a judged communication state is the stable state and controls the sending bit rate for sending the packets from the packet sender based on the predicted sending bit rate.

14. The communication system of claim 1, wherein the sending terminal includes an encoder for encoding sending data, wherein the controller predicts an encoding rate which is higher than a present rate and sufficient for maintaining a stable state when a judged communication state is the stable state and controls the encoding rate for encoding the sending data by the encoder based on the predicted encoding rate.

15. The communication system of claim 1, wherein the controller determines a number of redundant packets based on at least one of a difference between the calculated moving average of jitter and a threshold value of the moving average of jitter and a difference between the calculated packet loss rate and a threshold value of the packet loss rate, wherein the packet sender sends the redundant packets according to the determined number of the redundant packets.

16. The communication system of claim 1, wherein the controller determines a number of packets which can correct an error based on at least one of a difference between the calculated moving average of jitter and a threshold value of the moving average of jitter and a difference between the calculated packet loss rate and a threshold value of the packet loss rate, wherein the packet sender sends redundant packets according to the determined number of the packets which can correct the error.

17. The communication system of claim 1, wherein the controller predicts the future communication state based on changes in the calculated moving average of jitter and the calculated packet loss rate.

18. A communication method in a communication system including a sending terminal and a receiving terminal comprising:
   sending packets from the sending terminal;
   receiving the packets by the receiving terminal;
   calculating a moving average of jitter and a packet loss rate based on the received packets;
   sending the calculated moving average of jitter and the calculated packet loss rate from the receiving terminal;
   receiving the calculated moving average of jitter and the calculated packet loss rate by the sending terminal; and
   predicting at least one future communication state based on the calculated moving average of jitter and the calculated packet loss rate,
   wherein the at least one future communication state includes a future congested state or a recovery from a current congested state,
   wherein the controller predicts that the communication state will develop into the future congested state when the calculated packet loss rate is below the threshold value of the packet loss rate and the calculated moving average of jitter exceeds the threshold value of moving average of jitter; and
   wherein the controller predicts that the communication state will recover from the current congested state when the calculated packet loss rate exceeds the threshold value of the packet loss rate and the calculated moving average of jitter is below the threshold value of moving average of jitter.

19. A sending terminal operably connected to a receiving terminal, comprising:
   (1) a packet sender for sending packets to the receiving terminal;
   (2) a receiving state receiver for receiving a moving average of jitter and a packet loss rate which are calculated based on received packets by the receiving terminal from the receiving terminal; and
   (3) a controller for predicting a future communication state based on the calculated moving average of jitter and the calculated packet loss rate,
   wherein the controller predicts a sending bit rate which is higher than a present rate and sufficient for maintaining a stable state when a judged communication state is the stable state and controls the sending bit rate for sending the packets from the packet sender based on the predicted sending bit rate.

20. A communication system comprising a sending terminal and a receiving terminal operably connected to the sending terminal,
   wherein the sending terminal includes a packet sender for sending packets,
   wherein the receiving terminal includes a packet receiver for receiving the packets, a receiving state monitor for calculating a moving average of jitter and a packet loss rate based on the received packets, and a receiving state sender for sending the calculated moving average of jitter and the calculated packet loss rate,
   wherein the sending terminal further includes a receiving state receiver for receiving the calculated moving average of jitter and the calculated packet loss rate, and a controller for performing a rate control based on at least one of a difference between the calculated moving average of jitter and a threshold value of the moving average of jitter and a difference between the calculated packet loss rate and a threshold value of the packet loss rate.

21. The communication system of claim 20, wherein the controller determines a control amount of a sending bit rate based on at least one of the difference between the calculated moving average of jitter and the threshold value of the moving average of jitter and the difference between the calculated packet loss rate and the threshold value of the packet loss rate and controls the sending bit rate for sending the packets from the packet sender based on the determined control amount of the sending bit rate.

22. The communication system of claim 20, wherein the sending terminal includes an encoder for encoding sending data, wherein the controller determines a control amount of an encoding rate based on at least one of the difference between the calculated moving average of jitter and the threshold value of the moving average of jitter and the difference between the calculated packet loss rate and the threshold value of the packet loss rate and controls the encoding rate for encoding the sending data by the encoder based on the determined control amount of the encoding rate.

23. The communication system of claim 20, wherein the controller determines a control amount for the rate control and wherein the control amount for the rate control is variable according to at least one of the difference between the calculated moving average of jitter and the threshold value of the moving average of jitter and the difference between the calculated packet loss rate and the threshold value of the packet loss rate.

24. A communication system where packets are communicated comprising:
 a monitor for calculating at least two values each representing a communication quality of packet communication, and
 a controller for predicting at least one future communication state based on at least the two values calculated by the monitor
 wherein the at least one future communication state includes a future congested state or a recovery from a current congested state,
 wherein the controller predicts that the communication state will develop into the future congested state when the calculated packet loss rate is below the threshold value of the packet loss rate and the calculated moving average of jitter exceeds the threshold value of moving average of jitter; and
 wherein the controller predicts that the communication state will recover from the current congested state when the calculated packet loss rate exceeds the threshold value of the packet loss rate and the calculated moving average of jitter is below the threshold value of moving average of jitter.

25. The communication system of claim 24, wherein the at least two values include a moving average of jitter and a packet loss rate.

* * * * *